J. P. FULGHAM.
Fertilizing Attachment for Seeding-Machines.
No. 214,900. Patented April 29, 1879.
Fig. 1.
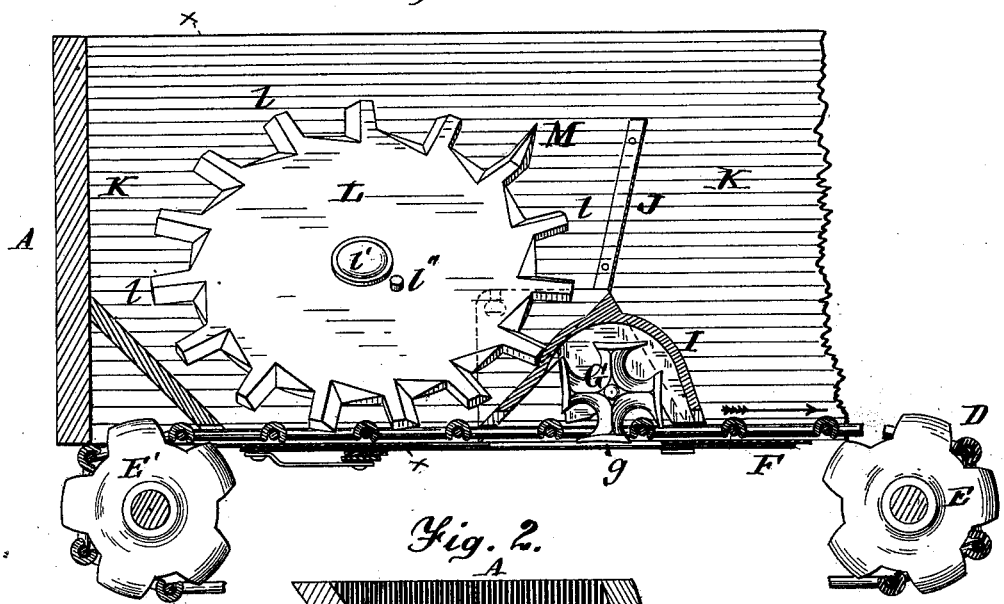
Fig. 2.
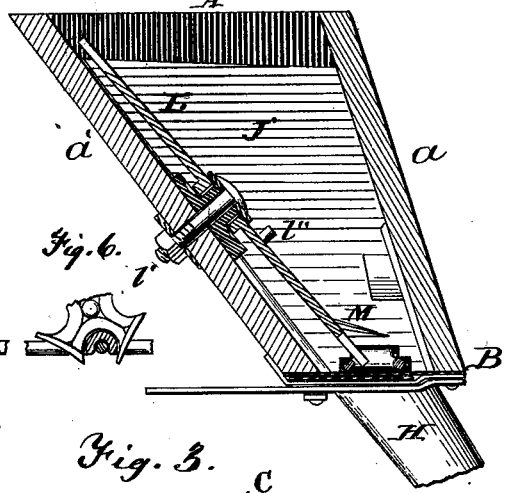
Fig. 4.  Fig. 5.  Fig. 6.
Fig. 3.
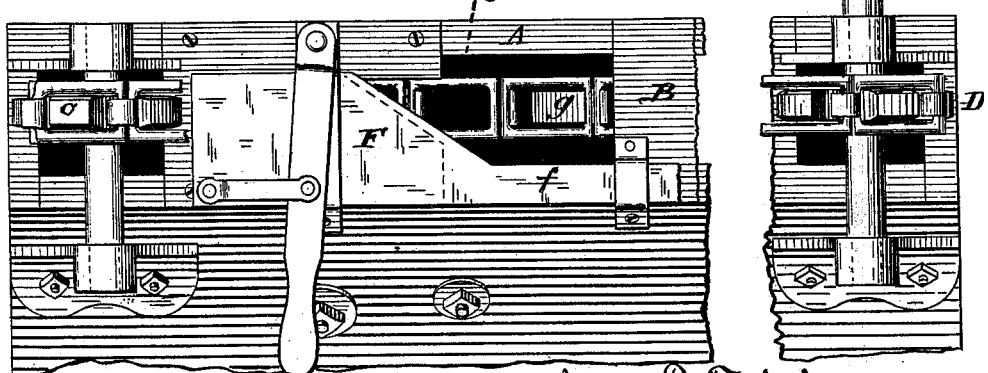
Attest
Waller Knight
Harry Knight
Jesse P. Fulgham
By Knight Bros.
attys.
N. PETERS, PHOTO-LITHOGRAPHER, WASHINGTON, D. C.

UNITED STATES PATENT OFFICE.

JESSE P. FULGHAM, OF RICHMOND, INDIANA, ASSIGNOR TO WAYNE AGRICULTURAL COMPANY, OF SAME PLACE.

IMPROVEMENT IN FERTILIZING ATTACHMENTS FOR SEEDING-MACHINES.

Specification forming part of Letters Patent No. 214,900, dated April 29, 1879; application filed March 3, 1879.

*To all whom it may concern:*

Be it known that I, JESSE P. FULGHAM, of Richmond, in the county of Wayne and State of Indiana, have invented a new and useful Fertilizing Attachment for Seeding-Machines, of which the following is a specification.

This invention relates to that class of implements known as "fertilizing attachments for seeding-machines," and particularly to an improvement in the feeding device, whereby the fertilizing material is discharged with certainty and regularity, and in any desired quantity.

My invention is an improvement in those fertilizer-distributers in which a flat link or buckle endless chain is placed in the bottom of the fertilizer-hopper in such a way that by the use of suitable driving mechanism it will be drawn continuously through the hopper; and I employ, in connection with such chain, peculiarly formed and located ventages in the hopper-bottom at intervals to correspond with the grain-feed cups. I further employ, in combination with such chain and ventages, bridges, under which the chain passes, somewhat larger than the spaces in the chain-links, and of sufficient size to cover a part only of each respective opening, sufficient intervals being provided between the consecutive bridges to permit free access of compost and of my agitating-disk to the distributing-chain.

I further provide underneath the hopper-bottom sliding valves, in such a manner that the part of the openings not covered by the bridges may be opened or closed at pleasure by means of a suitable lever.

I further provide sprocket-wheels of peculiar construction underneath the bridges, and above and intermeshing with the chain, in such a way that the motion of the chain causes said wheels to revolve, and their teeth, as they reach the lowest point in their circuit, to protrude or project through the links of the chain, thus insuring the discharge of all material carried under the bridges, and automatically cleaning the chain.

I further provide an outleaning flaring side to the hopper, and toothed disks, which revolve with the chain, the other side of the hopper being vertical, or preferably leaning toward the first, so as to throw the weight of the material on the said flaring side and onto said disks, and so as to agitate the contents, and to prevent the massing or bridging of the same.

I further provide on one tooth or more of each agitating-disk a knife, for the purpose of comminuting hard lumps of fertilizer, and of keeping the openings under the bridges clear.

I further provide a transverse partition that extends from the crown of each bridge to a height sufficient to prevent the fertilizing material being carried by the toothed disks toward one end of the hopper.

In the accompanying drawings, Figure 1 is a vertical section of a portion of my apparatus included in one compartment, the section being taken in the plane of the sprocket-wheels. Fig. 2 is a vertical section in the plane $x$ $x$ of Fig. 1. Fig. 3 is an under-side view of the hopper-bottom. Figs. 4, 5, and 6 are diagrams illustrative of the action of the sprocket-wheel upon the endless chain.

The fertilizing material is contained in a hopper, A, preferably secured in the immediate rear of the grain-box, its front side, $a$, either vertical or (still better) slightly back-leaning, and its rear side, $a'$, leaning or flaring considerably backward, in the manner shown. B is the floor thereof, having a series of equidistant orifices, C.

D is an endless chain, whose upper member is dragged along the hopper-floor by one, E, of two sprockets, E E', around which said chain is engaged.

F represents a slide valve or gate, located immediately underneath the hopper-bottom, and having as many trapezoidal openings $f$ as there are orifices in the hopper-bottom, and whose adjustment to the right or left enlarges or diminishes the areas of all the openings equally.

G is one of a series of fan-tail sprockets journaled in the hopper vertically, and in the plane of the chain's motion, one over each orifice C. Each wheel G engages, by its (for the time being) lowest tooth, in the subjacent link of the endless chain, through which it momentarily protrudes, so as to force the fertilizing material through the chain and into the orifice C, whence, escaping through the opening $f$, it descends through duct H into the grain-spout. The passage of the chain causes the series of sprockets G to slowly revolve, and this motion, in conjunction with the peculiarly-formed teeth $g$, causes the complete expulsion through the openings of the chain of all compost, no matter how pasty or adherent, and even causes the chain-knuckles to be kept clear of compost, as indicated in the diagrams 4, 5, and 6.

Over each fan-tailed sprocket G is a bridge or canopy, I, from whose crest rises a transverse partition, J, to a height sufficient to prevent the gathering or working of the compost toward that end of the hopper toward which the chain is traveling. The hopper-space is thus partitioned off into a series of pockets or compartments, K, one for each discharging-orifice.

The chain-driving sprocket E is impelled by any suitable means—as, for example, by bevel-wheel X, gearing with a corresponding wheel on the feed-rod, or by chain or geared connection with the ground wheel or axle.

L represents one of a series of agitating-disks, journaled slightly in front of and nearly parallel to the flaring side $a$ of the hopper.

Each disk is armed around its periphery with a series of teeth, $l$, which serve to agitate, without actively stirring, the contents of the hopper.

The rotation of the disk L is secured by what is for the time being its lowest tooth meshing in the chain D.

In order to secure the occasional severance of the departing compost from the mass of fertilizer above it, one or more of the teeth $l$ is armed with a knife or lancet, M, which, when it approaches its lowest position, projects horizontally over the chain.

In the form shown, when the pivot $l'$ extends through the disk L, a projection, $l''$, is formed on the inner face of the disk to insure the agitation of the mass at this part; but if the pivot is cast or otherwise firmly secured to the rear side of the disk such projection may be omitted.

The size of the bridges and their separating-intervals is such as to provide room between the consecutive bridges for the play and access of the chain of the agitating-disks L, and for free access and ample agitation of the superincumbent compost.

While preferring to locate the sliding valve immediately under the hopper-bottom, I reserve the right to apply it immediately above the bottom, if desired.

In operating my attachment, when the machine is put in motion, the chain, being drawn through the hopper, carries with it all the fertilizing material which the links contain, which material, passing under the bridges, is dropped through the openings in the hopper-bottom, and is conveyed to the ground through the same tubes that convey the grain; and should the material be of such a nature as to stick and mass within the hopper, or to adhere to the chain, it is disintegrated, and is forced by the sprocket-wheels through the links, and its discharge insured.

When the quantity is to be increased the sliding valve is retracted, exposing more or less of that part of each respective opening not covered by the bridge, and the chain and toothed disks are made effective to discharge an increased amount of material, which varies more or less as the opening is exposed, the projection or knife on one or more of the disk-teeth assisting in keeping the outlet clear of obstructions.

The toothed disks being journaled on the flaring side of the hopper, their revolution agitates the material sufficiently to prevent its bridging without stirring it or causing it to become pasty and sticky, which is a source of great trouble and failure with the fertilizing attachments heretofore employed.

I claim herein as new and of my invention—

1. The combination of the chain D and the fan-tailed sprocket-wheels or cleaners G, constructed and operating as specified.

2. The combination of the chain D, the fan-tailed sprocket-wheels G, and the bridges I, constructed and operating as specified.

3. The combination of the chain D, the bridges I, the sprockets G, and the openings C in the hopper-bottom.

4. The combination of the horizontally-moving chain D and angularly-arranged toothed disk L, substantially as and for the purpose described.

5. The described combination of toothed disk L, chain D, and flaring side $a'$ of the hopper.

6. The combination of the chain D, the toothed disks L, and the sliding valve F.

7. The combination of the chain D, the toothed disks L, and the knives or cutting projections M upon the said disks, for the purpose designated.

8. The combination, with the chain D and bridges I, of the transverse partitions J, as and for the purpose set forth.

9. The combination of the toothed disks L, the bridges I, and the partitions J over the bridges, constructed and operating as specified.

10. The combination of the chain D, the bridges I, the ventages C of the hopper-bottom, and the sliding valve F in immediate contact with said bottom, substantially as and for the purpose set forth.

In testimony of which invention I hereunto set my hand.

JESSE P. FULGHAM.

Attest:
GEO. H. KNIGHT,
L. H. BOND.